Oct. 19, 1954 — J. B. KIRBY — 2,691,986
DISHWASHING MACHINE
Filed Sept. 1, 1951 — 6 Sheets-Sheet 1
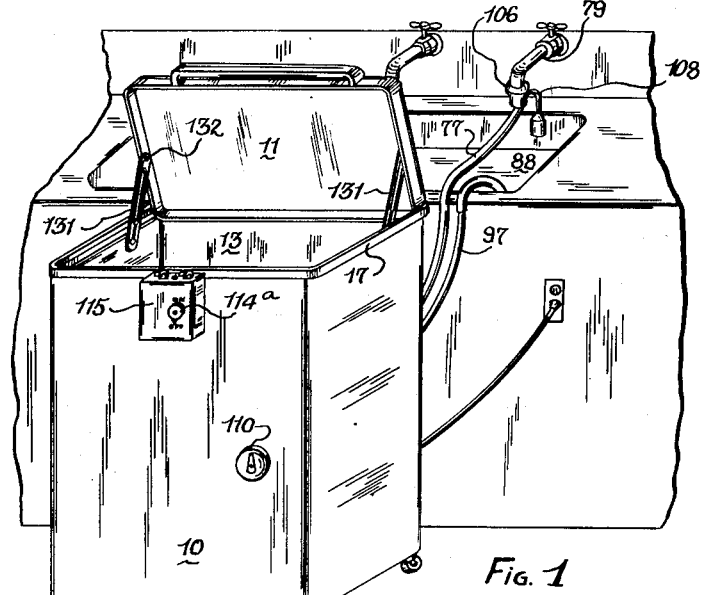
Fig. 1
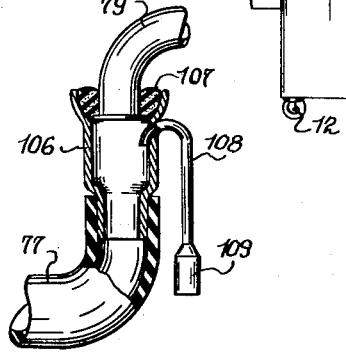
Fig. 1<sup>c</sup>
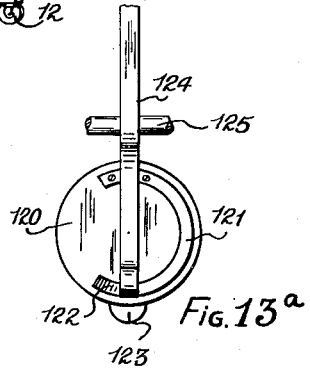
Fig. 13<sup>a</sup>
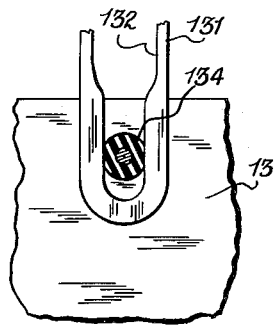
Fig. 1<sup>a</sup>
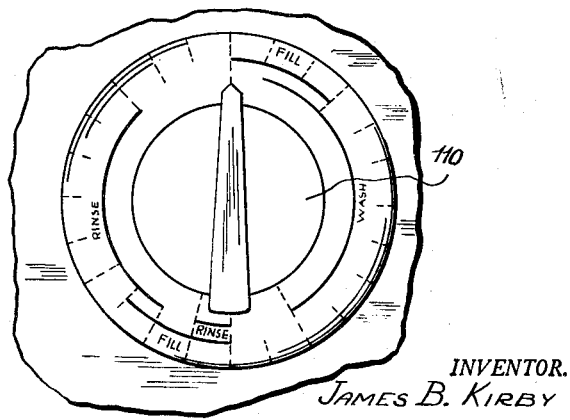
Fig. 1<sup>b</sup>
INVENTOR.
JAMES B. KIRBY
BY Richey & Watts
ATTORNEYS Oct. 19, 1954   J. B. KIRBY   2,691,986
DISHWASHING MACHINE
Filed Sept. 1, 1951   6 Sheets-Sheet 4

INVENTOR.
JAMES B. KIRBY
BY *Richey & Watts*
ATTORNEYS

Oct. 19, 1954  J. B. KIRBY  2,691,986
DISHWASHING MACHINE
Filed Sept. 1, 1951  6 Sheets-Sheet 5

INVENTOR.
JAMES B. KIRBY
BY Richey & Watts
ATTORNEYS

Oct. 19, 1954

J. B. KIRBY 2,691,986

DISHWASHING MACHINE

Filed Sept. 1, 1951

INVENTOR.
JAMES B. KIRBY
BY
Rickey & Watts
ATTORNEYS

Patented Oct. 19, 1954

2,691,986

UNITED STATES PATENT OFFICE 2,691,986

DISHWASHING MACHINE

James B. Kirby, West Richfield, Ohio

Application September 1, 1951, Serial No. 244,797

4 Claims. (Cl. 134—58)

This invention relates to machines for washing dishes and the like.

The principal object of this invention is to wash and rinse dishes, silverware, utensils and the like rapidly and thoroughly in an extremely short automatic cycle of operations so that one batch of articles can be washed and rinsed while the user is preparing a second batch and/or putting away a preceding batch so that an entire quantity of dishes and utensils for a meal can be washed, rinsed and dried in a minimum of time and with a minimum of effort and without the use of excessive quantities of hot water.

Another object of the invention is to repeatedly direct flat jets of water directly onto the different surfaces of the articles to be washed so that the articles are cleaned by direct impact of the water.

Another object is to divert the streams of water in all different directions and positions through the tub in a simple and economical manner by forces derived from the water itself without waste of water and without impairing the force with which the streams or jets of water strike the surfaces to be cleaned.

Another object of this invention is to interlock a dishwashing mechanism with the cover of the machine so as to prevent opening of the cover during the progress of the washing and rinsing operations and to open the cover automatically at the conclusion of the cycle to permit quick drying of the dishes and utensils which have been washed.

Another object of the invention is to thermostatically control the fresh water entering the dishwashing machine so that fresh water is by-passed with respect to the dishwashing compartment until such fresh water has reached a predetermined high temperature.

Another object of the invention is to flush out the water conduits and the washing compartment so as to remove food particles and soap film between the washing and rinsing operations.

Another object of the invention is to provide a dishwashing machine with a safety cover arrangement that prevents improper operation of the machine and protects the operator of the machine.

Other objects and advantages of this invention will appear in the following detailed description of the preferred embodiment thereof.

In the accompanying drawings:

Fig. 1 is a perspective view of the dishwashing machine of my invention arranged alongside of a conventional kitchen sink in position for operation;

Fig. 1a is an elevation with parts in section of the cover support for the dishwasher;

Fig. 1b is an enlarged showing of the timer control knob and indicia for the dishwashing machine;

Fig. 1c is an enlarged detail showing with parts in section of the filler hose arrangement incorporated in the dishwasher of my invention;

Fig. 13a is a detail showing the switch-actuated latch bar mechanism;

Figure 2:
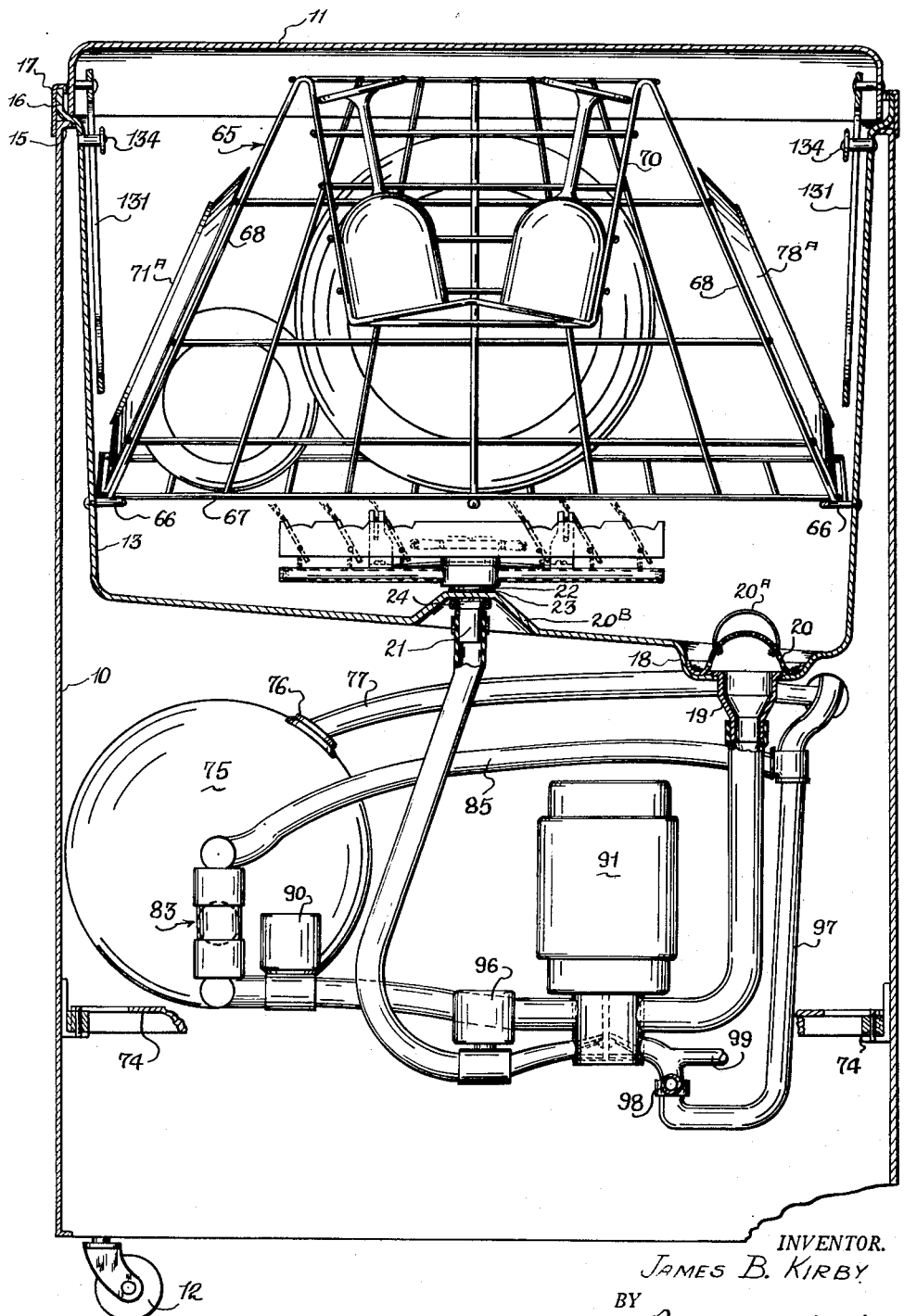
Fig. 2 is a front elevation with parts in section of the dishwasher made according to the present invention.

Referring to the drawings, the features of the present invention have been illustrated in a dishwashing machine of the portable type which can be placed adjacent a kitchen sink or the like with a drain hose hooked on the sink and the water supply hose connected to a hot water tap. It is to be understood, however, that many of the features of this invention are not limited to this type of machine, but can be embodied as well in other types of machine such as built in or permanent dishwashing machines. In the disclosed embodiment of Figs. 1 to 3 the machine is housed in a casing 10 having an opening through the top closed by a hinged cover 11 and supported on casters 12. A tub 13 supported within the casing is preferably made of synthetic resin reinforced with glass fibers or the like.

In the illustrated embodiment, the upper end of the casing 10, which may be made of any suitable metal is formed with an inturned flange 15 and the tub 13 has an outwardly offset rim 16 which rests upon the flange 15 to suspend the tub within the casing. A finishing strip 17 of metal or the like may be secured to the offset portion 16 and extend around the tub. The tub 13 has its bottom sloped toward a depressed pocket 18 which is centrally apertured to receive a drain pipe 19. A removable strainer 20 having a handle 20a is preferably arranged in the pocket 18 over the drain pipe 19. Near its center, the tub is formed with an upwardly reentrant portion 20b which is apertured to receive a water supply pipe 21.

Figure 18:
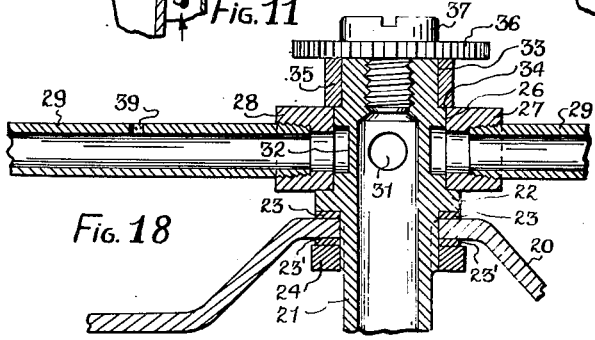
Fig. 18 is a sectional view of the apparatus employed to conduct the water to the washing jets in the dishwashing compartment.

As shown in detail in Fig. 18, the pipe 21 is formed with a flange 22 which engages a packing washer 23 contacting the upper wall of the reentrant portion 20b of the tub 13. A similar packing washer 23' is arranged at the lower side of the re-entrant portion. A nut 24 screwed upon a threaded portion of the pipe 21 tightly compresses the packing washers 23 and 23' between the flange 22 and the tub portion 20 to prevent leakage and hold the pipe 21 firmly in position.

Above the flange 22 the pipe 21 is formed with a cylindrical bearing surface 26 of smaller diameter than the flange 22 which closely fits a complemental cylindrical bearing surface of a ring 27 which is rotatably mounted on the bearing surface 26 and the upper surface of the flange 22. The ring 27 is formed with drilled and tapped bosses 28 into each of which is screwed a tube 29. In the illustrated embodiment, the tubes 29 are shown located diametrically opposite each other although a different number can be used if desired. The pipe 21 is formed with one or more lateral holes 31 opening into an annular groove 32 in the bearing surface 26 so that the interior of the pipe 21 is in fluid communication with the tubes 29 at all times during rotation of the ring 27 about the pipe 21. Above the bearing portion 26 the pipe 21 is formed with a reduced cylindrical portion 33 separated from the bearing portion 26 by a shoulder 34. A spacer sleeve 35 is clamped against the shoulder 34 and projects radially outward therefrom about the ring 27 so as to prevent vertical displacement of the ring 37 from its rotatable bearing. A ratchet wheel 36 is clamped against the spacer sleeve 35 by a screw 37 screwed into the tapped upper end of the pipe 21 so as to hold the parts assembled and also plug the upper end of the pipe at 21. Each of the pipes 29 is formed with three jet apertures 39 which preferably face vertically upward so that when liquid is forced through the pipe 29 six upwardly directed jets are emitted from the pipes 29 in any angular relation of the ring 27 to the pipe 29.

A stamping 41 is supported on the upper surface of the pipes 29 and the ring 27. Stamping 41 has flat end portions 42, each of which rests upon the upper surface of one of the pipes 29 and is secured thereto by a screw 43. Each of the end portions 42 is formed with a hole around the innermost jet openings 39. Each end portion 42 is also formed with upwardly bent parallel wings 44 which are notched at their upper ends at 45 to provide a pivotal support as hereinafter described. The stamping 41 also has a slightly raised central portion 46 which rests upon the upper surface of the ring 27 and is apertured at 47 to clear the spacer sleeve 35. The central portion 46 of the stamping is preferably spot-welded to the ring 27 around the aperture 47.

A framework consisting of parallel strips 50 secured in spaced relation by spacer sleeves 51 and bolts 52 extending therethrough is pivotally supported from the wings 44 of the stamping 41 by means of wire bails 53. Each of the wires 53 consist of a straight portion extending across between a pair of wings 44 and resting in the notches 45 thereof with its ends bent downwardly and upwardly as indicated at 54. The outwardly turned ends 54 of the wires 53 project loosely through holes 55 in the strips 50 so that the carriage is supported for a swinging movement in the direction of the length of the strips 50 but is restrained against lateral movement.

A plurality of flaps 56 are pivotally supported between the strips 50, one of the flaps 56 being located in vertical alignment with each of the jet openings 39 in the tubes 29. The lower portion of each of the flaps 56 is arranged to fit loosely between the opposite strips 50 and is formed on its opposite end edges with aligned projections 57 which extend loosely through aligned holes 58 in the strips 50. The upper portion of each of the flaps 56 is made wider than the spacing of the strips 50 which are formed with arcuate recesses 60 terminating in abutment shoulders 61 to permit limited pivoting movement of each flap 56 about its projecting pivot ears 57. The arcuate recesses 60 are curved on a radius from the holes 58 so that each flap 56 may pivot freely from one abutment shoulder 61 to the opposite shoulder, through an arc of about 45°.

A pair of spring pawls 62 are secured to the strips 50 and are formed with inwardly-turned ends 63 adapted to engage the teeth of the ratchet wheel 36. Each of the pawls 62 is clamped between one of the spacers 51 and the adjacent strip 50 between cooperation through-bolt 52 and the pawls are preferably arranged one on each side of the ratchet wheel 36 as illustrated so that movement of the carriage longitudinally thereof produces step-by-step rotation of the carriage, the stamping 41 and the tubes 29 and ring 27.

Figure 8:
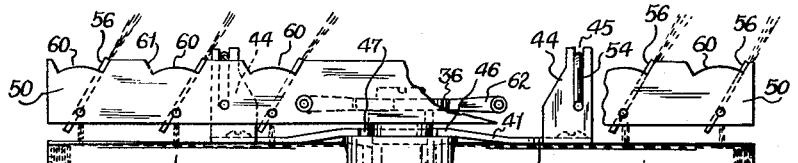
Fig. 8 is an elevation with parts broken away of the apparatus shown in Fig. 7.
Figures 9, 10:
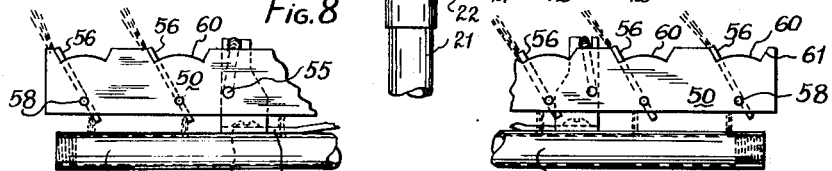
Figs. 9 and 10 show different positions of the blades for the water jet apparatus.

The pivotal ears 57 of each flap 56 are arranged near the lower edge of the flap 56, about one-third of the way up from the lower edge in the illustrated embodiment so that the flaps are pivoted below their center of gravity and normally up against one or the other of the limiting shoulders 61. Vertically moving jets of water from the jet openings 29 strike the lower ends of the flaps and are diverted in the direction in inclination of the flaps upwardly into the dishwashing space above the carriage. The lateral component of the force of the jet striking the flaps swings the carriage on the bails 53 in the opposite direction to that in which the water jets are being diverted. As soon as the carriage has moved far enough so that the pivotal ears 57 of the flaps have been moved out of the line of the jets so that all of their force is exerted against the upper portions of the flaps, the flaps reverse their position, swinging from the shoulder 61 against which they were resting across to the opposite shoulder 61 and at the same time swinging the projecting jet of water through a corresponding arc. As soon as the flaps have reversed, the force of the jets is directed against the lower portions of the flaps below the pivotal ears 57 and swings the carriage on the bails 53 in the opposite direction until the reversing action again takes place. (See Figs. 8, 9 and 10.) During each cycle of the swinging movement of the carriage the pawls 62 engaging the ratchet wheels 36 ratchet the entire assembly of the tubes 29, ring 27 and diverting carriage about the axis of the pipe 21 so that as the jets of water swing rapidly back and forth through an arc corresponding to the movement of the flaps 56, the entire assembly and the swinging jets rotate slowly about the center of the pipe 21.

The tube 29 may also be rotated without the use of the pawl and ratchet drive by having outlet openings 39 inclined in one direction at one side of the pipe 21 and in an opposite direction at the other side of pipe 21.

Figure 3:
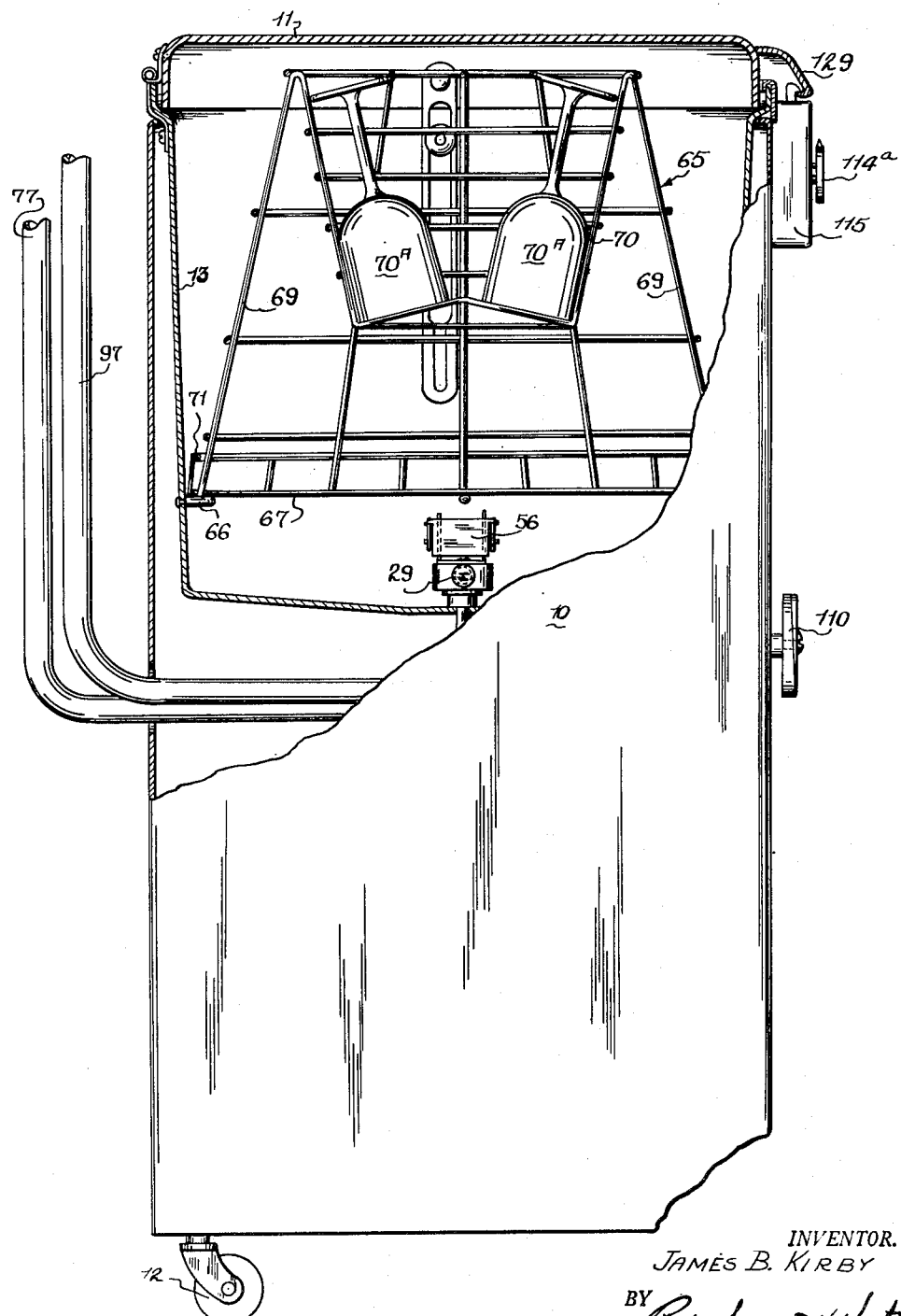
Fig. 3 is a side elevation of the dishwasher.
Figure 4:
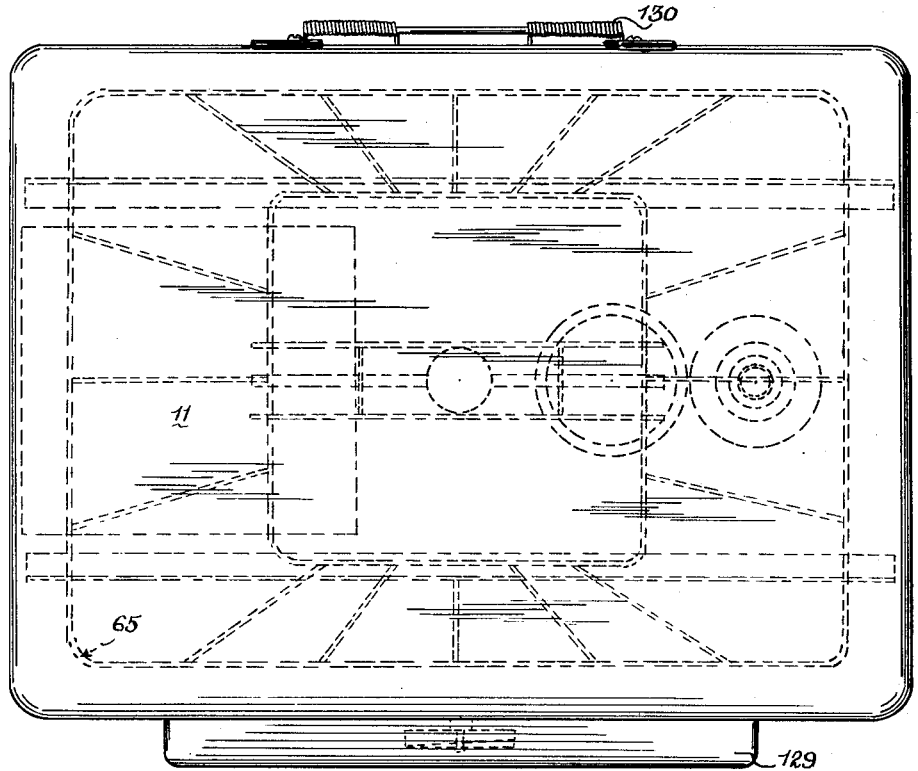
Fig. 4 is a plan view of the dishwasher showing the dish racks and other parts in phantom outline.

The dishes and utensils to be washed are supported in the tub 13 above the swinging and rotating jets of water by suitable racks or the like. In the preferred embodiment as illustrated in Figs. 2, 3 and 4, each machine is supplied with one or more racks 65, one of which may be supported in the tub by resting upon pins or the like 66 secured to and projecting inwardly from the inner wall of the tub 13. The rack 65 includes a generally rectangular lower frame member 67 which fits fairly closely within the tub 13 and inwardly inclined end walls 68 and side walls 69. The upper central portion of the rack is formed with a re-entrant downwardly extending portion 70. The end walls 68 and side walls 69 are provided, at their lower ends with short upwardly projecting wall sections 71 spaced outwardly from the side and end walls providing recesses to receive and hold the lower edges of plates 71a, saucers, platters and the like. Such dishes can be supported upon the side and end walls with their soiled surfaces facing inwardly so as to be more directly exposed to the water jets. The re-entrant portion 70 is arranged to receive glasses 70a, cups and the like with their open ends down so that the soiled surfaces are directly exposed to the water jets.

Figure 14:
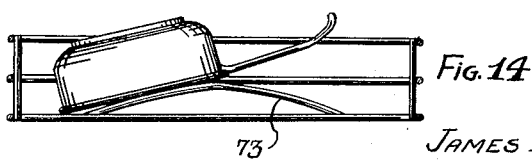
Fig. 14 shows a pan washing rack adapted to be used in the dishwasher.
Figure 7:
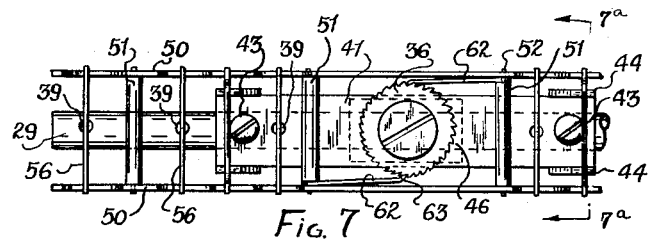
Fig. 7 is a plan view of the water jet apparatus embodied in my invention.
Figure 7A:
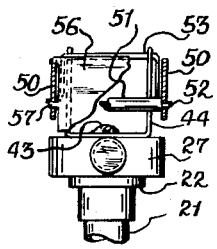
Fig. 7a is an end view of the device of Fig. 7.

A slightly different form of rack is illustrated in Fig. 14. This rack is provided with a raised re-entrant bottom wall 73 upon which one or more pots, pans and other utensils may be placed with the open sides downwardly and exposed to the water jets.

A frame 74 secured to the inner surface of the casing 10 near its lower end supports a mechanism for supplying wash water and rinse water to the inlet pipe 21. The storage tank 75 is supported upon the frame 74 and is provided near its upper end with an inlet pipe 76 to which is connected a flexible hose 77 which passes out through an aperture in the wall of the casing and is adapted to be connected at its end to a hot water faucet 79. An electrical heating element 80 is disposed within the tank 75 and is adapted to be energized to heat the water contained therein to any desired temperature.

Figure 15:
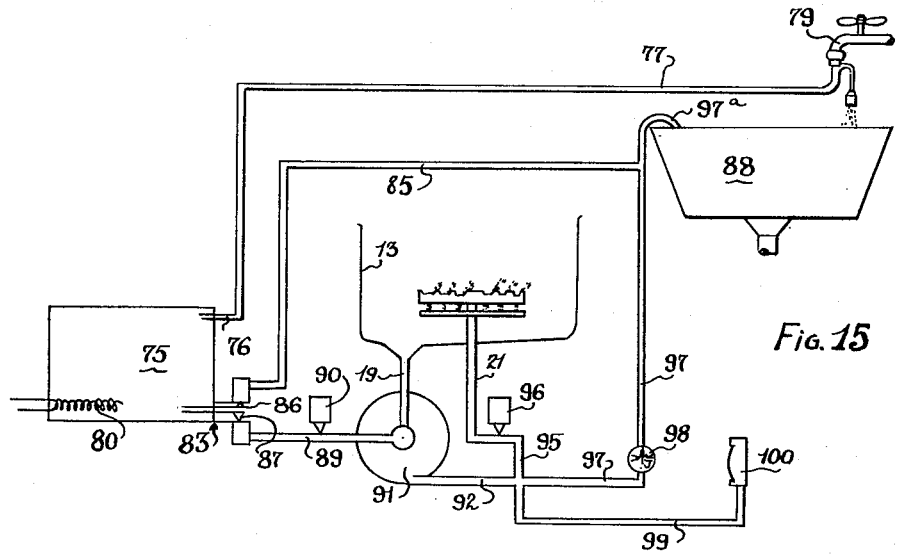
Fig. 15 is a diagrammatic showing of the water conduit and control valve arrangement for carrying out the dishwashing operations.

The operation of the apparatus employed to carry out the dishwashing operations may be best understood by reference to the diagrammatic showing of Fig. 15 and the structural showing of Fig. 2. Hot water is introduced to the tank 75 by the hose 77. At the outlet of the tank 75 there is arranged a dual valve 83 which determines that the water leaving tank 75 shall be directed to the washing compartment 13 or by-passed through the conduit 85 which leads the water to a sink drain. The dual valve includes a thermostatically controlled valve 86 and 87, the arrangement being such that until the water leaving the tank 75 reaches a predetermined high temperature, the valve 86 will be closed and valve 87 be open so as to direct the hot water through conduit 89. The conduit 89 includes a solenoid-operated valve 90 which will be referred to as the supply valve. When the valve 90 is open the water from tank 75 will be directed into the inlet side of the motor-pump unit 91. The outlet of the pump as at 92 leads to a conduit 95 communicating with the tube 21 adapted to lead the water upwardly into the washing compartment 13. The conduit 95 leading to the tube 21 includes a solenoid valve 96 which will be referred to as the recirculating valve.

Figures 11, 12:
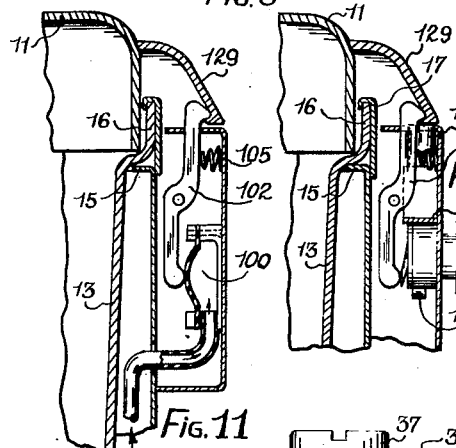
Fig. 11 is a sectional detail showing a fluid pressure control for the cover latch incorporated in the dishwasher.
Fig. 12 is a detailed sectional view showing the cam arrangement employed to control the cover latch of the dishwasher.

It will be observed that the apparatus above described is such that when the valve 96 is closed, the water from the pump outlet will go to conduit 97 leading to the sink 88. The conduit 97 includes a check valve 98 which restricts the flow in conduit 97 to a one-directional flow above the check valve 98. In communication with the outlet side of the pump 92 is a conduit 99 leading to a pressure responsive diaphragm 100. It will be understood that water pressure at the outlet side of the pump is effective through conduit 92 and 99 to maintain the diaphragm 100 distended (see Fig. 11) and that such position of the diaphragm 100 is effective to hold the cover latch 102 in its latched position. The diaphragm 100 is proportioned so that under pressure condition it is effective to overcome the spring 105 which normally tends to swing the latch 102 to an unlatched position. This means that as long as the pump is operating so as to direct the water to the diaphragm 100 the cover 11 will remain in its latched position through the latch 102. The drain for the washing compartment as at 19 also communicates with the inlet side of the pump 91.

To prevent the application of full water-line pressure to the tank 75, I have provided a faucet coupling for conduit 77 as illustrated in Fig. 1c. This coupling includes a metal tube 106 having a soft rubber ring 107 to surround and resiliently grip the depending portion of the faucet 79. The tube 106 includes a pressure relief outlet member 108. The depending tube 108 has at its lower end thereof a diffuser 109 to prevent splash of overflow.

Figure 16:
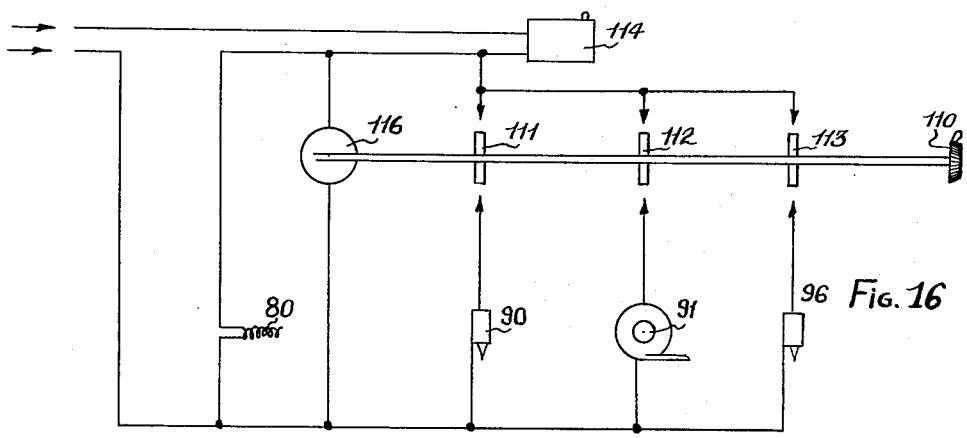
Fig. 16 is a diagrammatic showing of the timer control for carrying out the dishwashing operations.

The control of the machine includes a timer and appropriate circuits as indicated diagrammatically in Fig. 16. The timer construction includes the control knob 110 available to the user at the exterior of the dishwasher cabinet and cams 111, 112 and 113 designed to establish the electrical flow circuits controlling the pump and motor assembly 91 and the solenoids 90 and 96 for the conduits 89 and 95. The electrical heating element 80 for the storage tank 75 is not in the timer control circuit, but is controlled by the starting switch 114. The starting switch 114 is placed on the cover latch box 115 at the forward edge of the cabinet 10. It will be noted that on closing, switch 114, the motor for the timer as at 116 will be energized and will thereafter turn the cams 111, 112 and 113.

Figure 13:
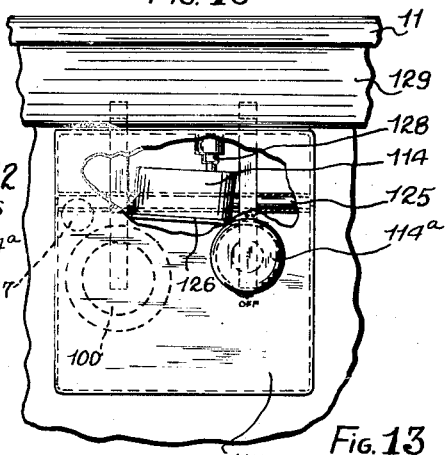
Fig. 13 is an elevation with parts broken away showing the cover latch control embodied in the dishwasher.

A portion of the latching control obtained in box 115 has already been described, namely that portion relating to the cover latch 102 in the diaphragm 100. The "on" and "off" switch 114a which controls the switch 114 will now be described. In Fig. 13a the reverse side of the member operated by 114a is shown. This arrangement includes a drum 120 within the control box 115 which drum is fixed to the shaft of the knob 114a. The drum 120 includes two cam means, namely a circular spring cam 121 which has a high portion at 122 and the cam or bump 123. The member 121 bears against the lower edge of a pivoted latch bar 124. The latch bar 102 (Fig. 11) and the latch bar 124 (Fig. 12) are pivoted on a transverse pin 125. The two latch bars 102 and 124 are held in spaced relation on the pin 125 by tubular sleeve members. The microswitch 114 is supported within the box 115 on a plate 126 which plate is pivotally mounted on the forward wall of the box 115 as at 127. When the drum 120 is turned 180° the bump 123 raises the plate 126 so as to raise the microswitch 114. When the microswitch is in its raised position, which is the "on" position of the knob 114a, it is actuated by a vertical pin 128. The vertical pin 128 projects through the upper surface of the box 115 where it is engageable by the forward edge of the cover bar 129. (See Fig. 12.) Thus it will be understood that the closing of the cover will be ineffective to operate the switch 114 until the "off" and "on" knob 114a is turned to the "on" position.

Figure 5:
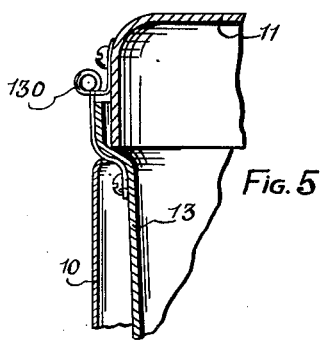
Fig. 5 is a detailed showing with parts in section of the spring hinge arrangement for the dishwashing cover.
Figure 6:
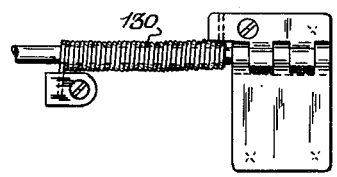
Fig. 6 is a detailed showing of the spring hinge arrangement for the cover.

The cover 11 is normally urged to an open position by the spring-hinge arrangement shown in Figs. 4, 5 and 6. Since there are two latches 102 and 124 for holding the cover down, the cover will remain down as long as either of the latches are in the positions shown in Figs. 11 and 12. In the event that there is pressure in the diaphragm 100 and the knob is turned to the "off" position, latch 102 will hold the cover down. In the event there is no pressure in the diaphragm 100, the cover will be held down by the latch 124 when the drum 120 is turned to the position shown in Fig. 12.

The upward swinging movement of the cover 11 in response to the spring 130 is limited by the brace 131. The brace 131 is pivoted to the cover at its upper end as at 132 and is slotted throughout its length as best illustrated in Fig. 1a. The slot indicated at 132 rides on a resilient button 134 secured to the tub 13. The slot is narrowed at the end remote from pivot 132 so that when the cover approaches its maximum open position, it is resiliently brought to a gradual stop by the arrangement shown in Fig. 1a.

Figure 17:
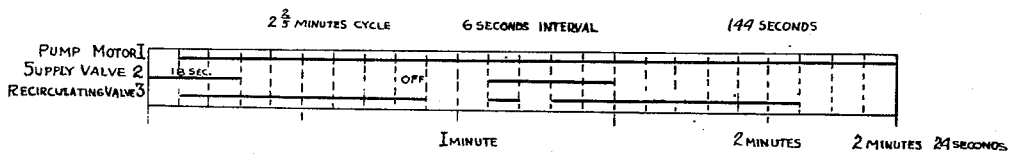
Fig. 17 is a chart of the time cycle employed in the washing and rinsing operations of the dishwasher.

As will be noted from the timing chart of Fig. 17, the time cycle for the washing machine of my invention is extremely short. This is made possible by the efficient washing action of the apparatus within the washing compartment and the efficient control of the washing fluid. The first line on the timing chart indicates the time of operation of the motor-pump unit 91. The second line on the time chart indicates the timing of the supply valve 90. Line number 3 on the time chart indicates the time of operation of the recirculating valve 96. It will be noted that the supply valve 90 is open for a period of 18 seconds when the hot water is introduced to the pump and circulating system, and that the supply valve thereafter remains closed until the beginning of the rinse cycle.

Overlapping the last 12 seconds of the open supply valve, the recirculating valve is opened so that the wash water is recirculated up through the tube 21 and into the washing compartment and, thence, down through the drain pipe 19. The recirculating or washing period is continued for 48 seconds when it is interrupted for a period of 12 seconds, is thereafter open for a period of 6 seconds, a 6 second interruption and then resumes for a period of 48 seconds. It will be noted that both the supply valve 90 and the recirculating valve 96 are both closed for 12 seconds after the washing or recirculating period. During said 12 second interval, the pump motor continues to operate so that the washing fluid withdrawn from the compartment 13 is pumped out of conduit 97 into the sink drain.

After said 12 second "pump out period" both the supply valve 90 and the recirculating valve 96 are open. The open period of the supply valve at the start of the rinse cycle is 24 seconds, whereas, the open period for the recirculating valve 96 is but 6 seconds. The 6 second recirculation at the start of the rinse cycle flushes the soapy water through the system which includes conduits 92, 95, 21 into the washing compartment 13 and, thence, downwardly to the pump. The 6 second interruption of the recirculation while the supply valve 90 is open causes such soapy water to be discharged entirely from the system through conduit 97.

The recirculation of the hot clean rinse water is thereafter resumed as indicated until there are 18 seconds remaining of the cycle. During said last 18 seconds of the cycle, both the supply valve and the recirculating valve are closed while the motor-pump unit 91 continues to operate. This results in the complete emptying of the rinse water from the washing compartment 13. During the emptying period of 18 seconds, the diaphragm 100 is responsive to the pump pressure and thereby prevents the opening of the cover by the operator. This means that the cover may not be inadvertently opened even though the on-off control knob were turned.

From the foregoing, it will be understood that the washing operation is started by opening the hot water faucet to run water into the tank 75. Ordinarily, the thermostat valve arrangement 86—87 by-passes the water through the conduit 85 into the sink. When the by-passed water stops running back into the sink, the water in tank 75 is hot enough to start the washing operation and the operator turns the on-off knob 114a to "on" position. The washing powder is then added to the dishes which are in place within the compartment 13 and the operator closes the cover which operates the switch 114 starting the timer motor through its cycle as indicated in Fig. 17. Thereafter, the timer carries the machine through the washing and rinsing cycles and shuts off the pump motor. When all of the water has been pumped out of the dishwashing compartment, the pressure drop in the diaphragm 100 permits the cover to be released and it is raised by the springs to open position.

Although I have shown and described one form of my invention in considerable detail, it will be understood that numerous modifications may be made therein without departing from the scope of the following claims.

What is claimed is:

1. A dishwashing machine comprising a casing having a washing compartment with an open top, a cover for closing the open top of the casing, spring means urging the cover to open position, washing means in said casing, a motor driven pump in said casing for operating said washing means to wash dishes contained in said compartment, a latch on the casing engageable with said cover for holding said cover in closed position, and fluid pressure responsive means connected to said pump and said latch to hold said latch engaged with said cover to hold same closed while said pump is in operation, a second latch, a switch for controlling the operation of the motor driven pump and manually operable means connected to said switch and said second latch.

2. In a washing machine, an upright open top casing, a hinged cover for the casing, a motor driven pump for circulating washing fluid, a latch for said cover, and a fluid pressure responsive means operatively connected to the pump and to said latch to hold the latch in engagement with said cover during operation of said pump.

3. A dishwashing machine comprising a casing having a washing compartment with an open top, a cover hingedly secured to said casing for closing the open top of the casing, spring means normally urging the cover to open position, rotating washing means in said casing, a motor driven pump in said casing for operating said washing means to wash dishes contained in said compartment, a latch for holding said cover in closed position, said latch normally urged to open position, and fluid pressure responsive means connected by a fluid line to said pump and engaging said latch to hold said latch engaged with said cover, to hold said cover closed while said pump is in operation, a second latch, a switch, and manually operable means connected to said switch and said second latch.

4. In a washing machine, an upright open top casing, a cover for the casing, secured thereto by means including a spring normally urging the cover to open position, a motor driven pump for circulating washing fluid, a latch for said cover, and a fluid pressure responsive means operatively connected to the pump and to said latch to hold the latch in engagement with said cover during operation of said pump.

References Cited in the file of this patent

UNITED STATES PATENTS

| Number | Name | Date |
|---|---|---|
| 564,906 | Van Camp | July 28, 1896 |
| 603,580 | Shaw | May 3, 1898 |
| 932,618 | Kunz | Aug. 31, 1909 |
| 1,323,199 | O'Bryne | Nov. 25, 1919 |
| 1,505,492 | Redding | Aug. 19, 1924 |
| 1,658,548 | Barley | Feb. 7, 1928 |
| 1,670,611 | Couch | May 22, 1928 |
| 1,891,639 | Gavaza | Dec. 20, 1932 |
| 1,980,065 | Johnston | Nov. 6, 1934 |
| 1,995,927 | Kirby | Mar. 26, 1935 |
| 2,030,092 | Benson | Feb. 11, 1936 |
| 2,038,803 | Olson | Apr. 28, 1936 |
| 2,136,259 | Walker | Nov. 8, 1938 |
| 2,157,112 | Bonner | May 9, 1939 |
| 2,194,342 | Walker | Mar. 19, 1940 |
| 2,278,268 | Kempton | Mar. 31, 1942 |
| 2,281,852 | Messler | May 5, 1942 |
| 2,284,026 | Stockham | May 26, 1942 |
| 2,349,985 | Page | May 30, 1944 |
| 2,403,526 | Harris | July 9, 1946 |
| 2,483,304 | Vogel | Sept. 27, 1949 |